Patented Dec. 5, 1950

2,533,132

UNITED STATES PATENT OFFICE 2,533,132

VAPOR PHASE FLUORINATION

Earl T. McBee, La Fayette, Ind., and Richard Marion Robb, Wilmington, Del., assignors to Purdue Research Foundation, West Lafayette, Ind., a corporation of Indiana No Drawing. Application August 30, 1944, Serial No. 552,016

3 Claims. (Cl. 260—653)

This invention relates to fluorination and is directed particularly to a method for the fluorination of organic compounds in the vapor phase.

Conventional procedures for the production of fluorine-containing organic compounds have included the treatment of organic compounds containing chlorine, bromine, or iodine with fluorinating agents such as HF, $SbF_3$, $HgF_2$, et cetera, which, under certain conditions tend to displace the established halogen with fluorine. Such methods of operation have not been particularly satisfactory because of difficulties in the preparation of many of the chloro, bromo, or iodo compounds necessarily employed as reactants, and the tendency of such fluorinating agents to displace a part only of the established halogen, whereby desired fluoro derivatives, and particularly fluorocarbons, have not been readily obtainable.

It must be recognized that fluorine per se is dissimilar to chlorine and bromine as regards its use in direct halogenation. This gas is very poisonous, corrosive, and tends to react with practically all organic materials with explosive violence. Most metal fluorides are unsatisfactory for ordinary exchange or double decomposition reactions because under the conditions necessary to obtain an exchange of halogen, they tend to produce undesirable by-products, such as those formed by decomposition or polymerization. A'so, they do not always give uniform or complete displacement of halogen other than fluorine in organic compounds. A further shortcoming of each of the foregoing substances resides in their comparative inoperativeness in the fluorination of hydrocarbons or other halogen-free organic compound. The required presence of chlorine, bromine, or iodine in the structure of organic reactants employed in most fluorinating operations complicates the problem of the recovery, purification, and analysis of reaction products. The expense and inconvenience of the special features of operation previously required have contributed materially to the slowness of development of the art of organic fluoro compounds. The need for new and improved procedures of fluorination is evident.

It is among the objects of the present invention to provide a fluorination method which will not be subject to the disadvantages set forth above. A further object is to supply a fluorinating agent which will be less hazardous in use than those previously known, yet adapted for the preparation of fluorocarbons and other highly fluorinated organic derivatives. Another object is to supply an improved procedure whereby the use of chlorinated, brominated, or iodinated intermediates will not be essential for the preparation of organic fluorine compounds. A still further object is to provide a procedure whereby fluorine-containing organic compounds may be prepared from partially or completely chlorinated, brominated, or iodinated intermediates or from partially fluorinated organic compounds. An additional object is to supply a method for the preparation of organic fluoro derivatives whereby the decomposition of the organic reactant and desired end product is substantially avoided. A further object contemplates the provision of a novel fluorinating agent. Other objects will become apparent from the following specification and claims.

According to the present invention, fluorination is accomplished by contacting an organic compound, containing at least one hydrogen atom or halogen atom other than fluorine attached to carbon in the vapor state with lead tetrafluoride as an active fluorinating agent. Lead tetrafluoride is a solid compound prepared conveniently by treating lead di-chloride with anhydrous hydrogen fluoride at about 200° C. to produce lead difluoride, and thereafter contacting the lead difluoride with fluorine at a temperature of about 200° C. or higher. Lead tetrafluoride is substantially stable at temperatures as high as 600° C. The fluorinating action exerted by lead tetrafluoride at reaction temperatures results in the substitution of fluorine for replaceable hydrogen directly attached to carbon, the addition of fluorine to unsaturated carbon linkages, and the replacement of halogens other than fluorine present in the compound. Lead difluoride and, generally, hydrogen fluoride are by-products of reactions in which the new fluorination agent is employed. Lead tetrafluoride may be regenerated conveniently from the by-product difluoride by contacting the latter with gaseous fluorine at temperatures above about 200° C., and desirably without removing the lead difluoride from the fluorination reactor.

Lead tetrafluoride is a powerful fluorinating agent for organic compounds generally. Processes embodying the use of lead tetrafluoride as the active fluorinating agent avoid many of the objectionable features characteristic of heretofore known fluorinating operations. The explosion hazard when working with lead tetrafluoride is negligible even though the reaction is exothermic. However, in spite of the less vigorous action exerted by lead tetrafluoride, it is possible to obtain any desired degree of fluorination therewith, including perfluorination, in accordance with the procedures set forth. It has also been observed that a minimum of decomposition and degradation or of polymerization of reactants results during fluorination with lead tetrafluoride, provided that a definite relationship be maintained between reaction temperatures and temperatures of substantial decomposition of organic reactant and intermediate products.

The operability of chlorine-, bromine-, and iodine-free organic compounds as reactants makes unnecessary the production of halo analogues as a preliminary step to obtaining the desired fluoro compounds. Also the new practice avoids the formation, except when desired, of mixed halo derivatives in which a portion only of the chlorine, bromine, or iodine has been displaced by fluorine. When halogenated organic compounds are employed as reactants, lead tetrafluoride is able, under suitable conditions, to displace halogen, other than fluorine, partially or completely to give fluorine-containing organic compounds.

The invention is carried out by contacting the organic compounds in vapor state with solid lead tetrafluoride at a reaction temperature. Any suitable corrosion resistant apparatus may be employed, whether of pressure-type construction or otherwise. By "corrosion resistant" is meant resistant to the action of lead tetrafluoride, of hydrogen fluoride, and of other by-products formed during the reaction, and/or of fluorine when it may be passed through the reactor for the regeneration of the lead tetrafluoride. If desired, an inert vapor, such as nitrogen or helium, may be employed as a diluent for the organic reactant vapor.

The operation is carried out conveniently by passing the vaporized organic reactant over a train of lead tetrafluoride and collecting the fluorine-containing reaction products. A satisfactory result is obtained when a metal tube or any other convenient type of reactor is packed with lead tetrafluoride in finely divided form and the vapors of the selected organic compound passed therethrough at reaction temperatures. When proceeding in this fashion, the reaction product usually is collected outside the reaction zone by condensing the effluent gases.

The organic compound employed as reactant may be vaporized by boiling and the vapors lead into the reaction zone. A convenient method of operation and one which aids in maintaining a continuous movement of the organic compound through the lead tetrafluoride includes bubbling a stream of inert gas, such as nitrogen or helium, through the liquid organic reactant at temperatures approaching the boiling temperature of the latter and passing the resulting gas mixture through the lead tetrafluoride-containing reaction zone. An alternate procedure includes premixing vapors of the reactant with an inert gas in a gasometer or similar equipment. Also, the organic reactant in liquid phase may be introduced portion-wise into the reaction zone and vaporized there. A further mode of operation includes the use of reduced pressure to aid in the vaporization of the organic substance, especially when high-boiling substances are to be reacted.

Regardless of the exact method employed in introducing the reactant, optimum results are obtained and minimum amounts of lead tetrafluoride are required when the latter is employed in finely divided form. Satisfactory yields have been obtained when operating with lead tetrafluoride in an amount in excess of that theoretically required to accomplish the desired degree of fluorination.

The exact temperature of operation may be from about 50° to 500° C. or higher, depending upon the boiling point of the reaction components, the degree of fluorination desired, the comparative stability of the organic compounds present in the reaction zone, and the length of time the organic reactant is to be contacted with the lead tetrafluoride. Generally speaking the preferred temperature range is from about 100° to about 450° C.

The vapor of the organic reactant is conveniently, although not necessarily, introduced into the reaction zone at an initial temperature at least as high as the boiling temperature of the reactant at the pressure employed, and the temperature thereafter increased gradually or stepwise to the temperature required to obtain the desired degree of fluorination. Under such conditions, a high percentage of the reaction product is swept through the reaction zone and may be recovered, as by condensation. When operating at a lower temperature, there is a tendency for appreciable amounts of fluorine-containing reaction products to be deposited on the lead tetrafluoride, the walls of the reaction chamber, or otherwise to be retained within the reaction zone. When this condition occurs, the lead tetrafluoride-containing reactor, or series of reactors, may be blown or swept out by passing a stream of inert gas therethrough at a temperature high enough to cause expulsion of the product.

A preferred mode of operation comprises successively subjecting the organic reactant to the action of lead tetrafluoride under conditions of progressively increasing temperature. It has been found that highly fluorinated organic compounds are very stable, and that heat stability increases with the degree of fluorination. A maximum of stability is obtained upon perfluorinating. Thus, it is desirable that the initial temperature of reaction be below the temperature of substantial decomposition of the organic reactant and that subsequent temperatures and exposure times to which the intermediate products of reaction are subjected be selected so as to be below the temperature and exposure time at which such intermediate reaction products undergo substantial decomposition. For optimum results, a balance may be struck between the maximum temperature to which the reactants and intermediates can be heated without substantial decomposition and that temperature at which fluorination is most readily accomplished.

A convenient method of operating includes employing a comparatively low initial temperature and increasing the temperature during the reaction, particularly in those instances where the organic constituents of the reaction mixture become more stable as the amount of fluorine therein increases, with the temperature reaching a maximum at the conclusion of the fluorination reaction. This may be accomplished in several ways. For example, the crude reaction product from the initial fluorination operation may be recycled in contact with lead tetrafluoride and the reaction temperature increased with each recycling operation until the desired degree of fluorination is obtained. An alternate procedure involves confining the lead tetrafluoride and organic reactant within a reaction zone and progressively increasing the temperature as the reaction proceeds. A further and preferred mode of operation includes passing the reactant through a plurality of fluorination units, e. g., two or more tubes packed with lead tetrafluoride and connected in series, with each successive unit or reaction zone being maintained at a temperature higher than that of the preceding unit. In any event, by operating at progressively increasing reaction temperatures, the desired degree of fluorination may be accomplished with a minimum of decomposition. A similar result is obtained when partially fluorinated organic compounds are employed as reactants to form more highly fluorinated or perfluorinated derivatives. In certain instances, the presence in the molecule of established fluorine atoms tends to increase the stability of the organic reactant so as to accomplish the desired result without such decomposition as might otherwise be expected under the conditions of reaction. In continuous operation it is usually desirable to provide means for cooling the reaction chamber.

The effluent gases from the reaction chamber may be collected and organic fluorine compounds therein recovered in any convenient manner as by fractional condensation, by condensing and distilling, by scrubbing the inert organic liquid, e. g., a fluorocarbon, to dissolve organic fluorine compounds, or with water to dissolve hydrogen fluoride, by adsorption of certain of the gaseous constituents on an inert solid, and in any of a number of other ways apparent to those familiar with the art. When the fluorination reaction involves the replacement of hydrogen with fluorine, hydrogen fluoride is formed as a valuable by-product which may, if desired, be recovered in anhydrous form by cooling the effluent gases, e. g., in a condenser cooled to a temperature at least sufficiently low to condense hydrogen fluoride, and separation of liquid hydrogen fluoride, which is substantially insoluble in many liquid organic fluorine compounds, from the condensate.

After the reaction products have been collected, they are conveniently reduced to liquid or solid form, and purified according to methods well known in the art. One mode of operation particularly applicable to water-insoluble and water-stable derivatives comprises successively washing the crude product with dilute aqueous alkali and water and thereafter fractionally distilling or steam distilling.

If a high degree of fluorination is desired, the initial crude fluorination product may be recycled as many times as required. This may be accomplished by contacting such crude products in the vapor state with fresh lead tetrafluoride. A particularly convenient method of operation includes regenerating the lead tetrafluoride originally employed and recontacting the initial product of reaction therewith. Such regeneration may be carried out by contacting the spent, or partially spent, lead tetrafluoride with gaseous fluorine at temperatures of about 200° C. or higher. This procedure of regeneration and recycling may be repeated as many times as is desirable or until the degree of fluorination desired has been obtained. A similar result is obtained by the use of a plurality of fluorination units connected in series. The time required to accomplish the desired degree of fluorination varies with the temperature employed, the organic reactant selected, the state of subdivision of the lead tetrafluoride and other factors. Although longer periods are usually employed, a period of contact of the organic reactant and lead tetrafluoride of a few seconds may be productive of an appreciable degree of fluorination.

The procedures as herein set forth may be carried out at subatmospheric, atmospheric, or superatmospheric pressure, provided only that the reaction occurs with the organic reactant in the gaseous state. The preferred temperature of reaction will vary with the pressure employed, and with the degree of fluorination desired.

A further preferred embodiment of the invention concerns operation with organic compounds containing at least two carbon atoms. Although single-carbon-atom compounds, such as methane, formaldehyde, methylene chloride, et cetera, are included within the scope of the broad invention certain difference with respect to the mode and mechanics of operation as between these compounds and those containing a plurality of carbon atoms have been found to be significant.

An important embodiment of the invention resides in the preparation of fluorocarbons. With the exception of carbon tetrafluoride, the preparation of this class of compounds has been found most difficult according to previously known methods of fluorination. The preparation of fluorocarbons is accomplished easily by using the herein described method. In preparing fluorocarbons, the organic reactant is preferably selected from the group consisting of hydrocarbons and partially halogenated hydrocarbons, including partially fluorinated hydrocarbons. Somewhat longer exposure times and higher temperatures of reaction than those employed in obtaining partial fluorination, and/or recycling of the partially fluorinated products obtained by a single pass of the initial reactant produce fluorocarbons in good yield. Satisfactory yields of fluorocarbons have been obtained when operating at a final temperature of between 200° and 400° C. or higher, depending upon the particular organic compound employed as a reactant.

The following examples are purely illustrative and are not to be construed as limiting:

*Example 1.—Fluorination of normal heptane*

An 8 foot length of 1.25 inch diameter copper tubing was packed with finely divided lead tetrafluoride and heated to 150° C. Normal heptane was warmed to 95° C. in a closed container fitted with an inlet tube extending below the surface of the heptane and an exit tube connected with the copper tube reactor. Nitrogen was bubbled through the hot heptane and the gaseous mixture of heptane and nitrogen passed into and through the hot fluorinating apparatus. The effluent gases from the fluorinating reactor were collected in an ice-cooled condenser, washed successively with aqueous sodium hydroxide and water, and the water immiscible portion thereof separated and dried. This product consisted mainly of fluorinated normal heptane containing sixty per cent by weight of fluorine.

*Example 2.—Fluorination of normal heptane*

Normal heptane was heated to its boiling temperature, and the heptane vapor contacted intimately with an excess of finely-divided lead tetrafluoride in a copper tube reactor and at a temperature of 200° C. The reactor was then swept out with nitrogen, and the effluent gases collected and condensed. The condensate was neutralized with aqueous alkali, washed with water, and dried. There was thus obtained a substantial yield of highly fluorinated heptane.

Example 3.—Fluorination of nonafluoromesitylene

In a manner similar to that of Example 2, nonafluoromesitylene or 1,3,5 tris (trifluoromethyl) benzene, was vaporized and passed through a copper tube packed with lead tetrafluoride and maintained at a temperature of 250° C. The nonafluoromesitylene reactant was caused to remain in contact with the fluorinating agent over a period of several hours, at the end of which time the reaction chamber was blown with nitrogen and the effluent gases collected and condensed. The resulting liquid mixture was washed successively with dilute aqueous sodium hydroxide and water, dried, and rectified. The product obtained contained a substantially higher proportion of fluorine than was present in the nonafluoromesitylene employed as reactant. The refractive index of the rectified reaction product was 1.38 as compared to a refractive index of 1.359 for nonafluoromesitylene.

Example 4.—Fluorination of diethyl ether

Diethyl ether was vaporized and passed through the copper tube reactor of Example 1 and in contact with finely-divided lead tetrafluoride at 250° C. over a period of several hours. The reactor was then swept out with nitrogen gas and the effluent vapors condensed. The crude fluorinated product was washed successively with dilute aqueous alkali and water, and the water immiscible components of the product separated and dried. The rectified product boiled at from 45° to 90° C. and contained 26.5 per cent by weight of fluorine.

Example 5.—Fluorination of benzotrifluoride

Benzotrifluoride was vaporized at 200° C. and the vapor passed through the copper tube reactor of Example 1 packed with finely-divided lead tetrafluoride and maintained at a temperature of 220° C. Throughout the introduction of the benzotrifluoride, the effluent gases from the reactor were collected in a condenser at 0° C. and the tube was thereafter blown with nitrogen to recover additional reaction product. The combined condensate was washed successively with dilute aqueous sodium hydroxide and water, and the water-immiscible portion of the product dried and rectified. A highly fluorinated product was obtained boiling at 95°–105° C. and containing fifty-two per cent by weight of fluorine.

Example 6.—Fluorination of benzene

The copper tube of Example 1 was charged with finely-divided lead tetrafluoride, heated to 230° C., and twenty milliliters of benzene passed therethrough over a period of several hours. The reaction products were condensed and washed successively with aqueous sodium hydroxide and water and the water-immiscible portion rectified. Three milliliters of unreacted benzene and seventeen milliliters of a fluorinated benzene product, containing 41.1 per cent by weight of fluorine were thus recovered.

Example 7.—Fluorination of benzene

Four thirty-inch lengths of 1.25 inch diameter copper tubing, connected in series, were charged with finely-divided lead tetrafluoride and heated to a temperature of 200° C. Ten grams of benzene in vapor form was passed through this reactor over a period of two hours, the effluent products being collected in an ice-cooled condenser containing aqueous potassium hydroxide. The reactor was then swept with nitrogen whereby a total of thirteen grams of liquid product was recovered. This product was washed with water, dried and rectified. An octafluorocyclohexane containing 67.2 per cent by weight of fluorine was obtained.

In a second operation in which ten grams of benzene was passed through the reactor at 200° C., a total of twelve grams of product was recovered containing 68.0 per cent by weight of fluorine.

Example 8.—Fluorination of octafluorocyclohexane

The lead tetrafluoride residue remaining in the copper tubes following the carrying out of the preceding example was regenerated by passing gaseous fluorine through the series of the tubes heated at 300°–350° C. Twenty grams of the octafluorocyclohexane product obtained as described in Example 7 was passed through the four unit copper reactors containing the regenerated lead tetrafluoride at 400° C., over a period of two hours. The reaction products were condensed. Fifteen grams of a water-immiscible product was recovered after washing the crude condensate with aqueous sodium hydroxide and with water. After distillation, the major portion of this mixture boiled at 50° C. The fraction boiling at 50° C. consisted mainly of perfluorocyclohexane melting at 49° C. and containing 76 per cent by weight of fluorine.

Example 9.—Fluorination of cyclohexane

A flat electrically heated, copper reactor consisting of a chamber five feet long, eight inches wide and one inch deep, and equipped with facilities for accurate temperature control, was packed with finely-divided lead tetrafluoride. Twenty-five milliliters of cyclohexane was passed through the reactor at 225° C and the reactor then swept out with nitrogen. The products of the reaction were condensed in an ice-cooled condenser, washed with aqueous sodium hydroxide and water, and dried. The resulting liquid product contained 4.5 per cent by weight of fluorine.

Example 10.—Fluorination of trichlorethylene

In a manner similar to that of Example 9, twenty-five milliliters of trichlorethylene was passed over lead tetrafluoride at 225° C. One of the reaction products consisted of a highly fluorinated fraction containing 62.4 per cent by weight of fluorine and 15.2 per cent of chlorine.

Example 11.—Fluorination of acetone

Twenty-five milliliters of acetone was passed in vapor form through the copper reaction chamber of Example 9, packed with finely-divided lead tetrafluoride. The reactor and contents were maintained at a temperature of 170° C. throughout the addition of the acetone. The reaction chamber was then blown with nitrogen, and the effluent gases condensed in a cooled trap. A highly fluorinated aliphatic liquid boiling below 20° C. was obtained.

Example 12.—Fluorination of acetophenone

An operation similar to that of Example 11 was carried out in which twenty-five milliliters of acetophenone was passed over lead tetrafluoride at a temperature of 260° C. A low boiling fraction containing 66.5 per cent by weight of fluorine, a medium boiling fraction containing 60.6 per cent by weight of fluorine, and a higher boiling fraction containing 45.8 per cent by weight of fluorine were obtained.

Other organic compounds which may be reacted with lead tetrafluoride substantially as disclosed in the preceding examples include isobutane, isobutylene, isooctane, cetane, propionic acid, butyl ether, hexadecane, diethylbenzene, isopropylbenzene, mixed chlorofluoroxylenes, biphenyl, naphthalene, styrene, hexafluoroxylene, phenetole, ethyl acetate, acetic anhydride, isopropyl ether, paraffin wax, vaporizable coal tar fractions, nitroparaffins, nitroaromatics, polyalkyl benzenes, carbon tetrachloride, methylene chloride, halogenated aliphatic compounds, halogenated heterocyclic compounds, halogenated alicyclic compounds, heterocyclic compounds, alicyclic compounds, chloronaphthalene and other halogenated fused-ring systems, diphenylbenzenes, "Santowax" and similar products, various petroleum fractions, and polynuclear hydrocarbons.

We claim:

1. In a method for the perfluorination of a monocyclic hydrocarbon, with retention of the carbon structure of the starting monocyclic hydrocarbon, the steps which include: (1) vaporizing a monocyclic hydrocarbon, (2) maintaining solid finely-divided lead tetrafluoride in a reaction zone at a temperature between about 50 degrees and about 500 degrees centigrade, and at a temperature above the boiling point of the starting monocyclic hydrocarbon, (3) causing the vapor of the starting monocyclic hydrocarbon to react with the lead tetrafluoride in the reaction zone, with replacement, with fluorine, of hydrogen bound to carbon in the starting monocyclic hydrocarbon, and with saturation, with fluorine, of double bonds present in the starting monocyclic hydrocarbon, (4) recycling non-perfluorinated reaction product into contact with lead tetrafluoride at the said reaction temperature to cause replacement, with fluorine, of all remaining hydrogen bound to carbon, and saturation, with fluorine, of any remaining double bonds, and (5) separating from the reaction product a perfluoro monocyclic organic compound having the same carbon structure as the starting monocyclic hydrocarbon.

2. The method of claim 1, wherein the starting monocyclic hydrocarbon is an aromatic hydrocarbon.

3. The method of claim 1, wherein the temperature in the reaction zone is above about 200 degrees centigrade.

EARL T. McBEE.
RICHARD MARION ROBB.

REFERENCES CITED

The following references are of record in the file of this patent:

UNITED STATES PATENTS

| Number | Name | Date |
| --- | --- | --- |
| 1,914,135 | Lacy | June 13, 1933 |
| 2,004,932 | Daudt et al. | June 18, 1935 |
| 2,013,035 | Daudt et al. | Sept. 3, 1935 |
| 2,024,008 | Midgley et al. | Dec. 10, 1935 |
| 2,062,743 | Daudt et al. | Dec. 1, 1936 |
| 2,192,143 | Midgley et al. | Feb. 27, 1940 |
| 2,220,713 | Grosse et al. | Nov. 5, 1940 |
| 2,238,242 | Balon et al. | Apr. 15, 1941 |
| 2,423,045 | Passino et al. | June 24, 1947 |

FOREIGN PATENTS

| Number | Country | Date |
| --- | --- | --- |
| 214,293 | Great Britain | Apr. 14, 1924 |
| 2,141/31 | Australia | Jan. 20, 1933 |
| 429,591 | Great Britain | May 28, 1935 |
| 786,123 | France | June 3, 1935 |

OTHER REFERENCES

"Chemical Abstracts," vol. 25, pages 3642 (1931), abstract of article by Dimroth et al.

Henne et al.: "J. A. C. S.," vol. 63, pages 3478-3479 (1941).

Moissan: "Comptes rendus," vol. 130, pages 622-627 (1900).

Ruff: "Ber. deutsch. Chem. Gesell.," vol. 39, pages 4310-4318 (1906).

Ruff et al.: "Zeitsch. Anorg. Allgem. Chem.," vol. 219, pages 143-148 (1934).

Wartenberg: "Zeitsch. Anorg. Allgem. Chem.," vol. 244, pages 337-347 (1940).

Ruff: "Zeit. fur Anorg. Chemie," vol. 98, 27-37 (1916).

Dimroth et al.: Berichte, vol. 64B, 516-22 (1931).